United States Patent
Seaton (12) 
(10) Patent No.: US 6,182,718 B1
(45) Date of Patent: Feb. 6, 2001

(54) PASS-THROUGH DISPENSER SYSTEM WITH ALIGNED FEEDER TROUGHS

(75) Inventor: Kenneth C. Seaton, Denver, CO (US)

(73) Assignee: Summit Machine Builders, Corp., Denver, CO (US)

( * ) Notice: Under 35 U.S.C. 154(b), the term of this patent shall be extended for 0 days.

(21) Appl. No.: 09/333,114

(22) Filed: Jun. 15, 1999

(51) Int. Cl.$^7$ .................................................... B65B 1/34
(52) U.S. Cl. ............................................. 141/128; 141/83
(58) Field of Search ............................... 141/128, 92, 94, 141/71, 72, 73, 74, 80, 83; 222/55, 56, 77; 198/568, 566

(56) References Cited

U.S. PATENT DOCUMENTS

| | | | |
|---|---|---|---|
| 3,334,787 | * 8/1967 | Sugimoto et al. | 222/55 |
| 3,578,094 | * 5/1971 | Henry et al. | 222/55 |
| 3,581,871 | * 6/1971 | Forman | 222/55 |
| 3,604,928 | * 9/1971 | Starnes | 250/359.1 |
| 4,062,413 | 12/1977 | Parker | 177/122 |
| 4,266,691 | 5/1981 | Wolwowicz | 222/77 |
| 4,382,527 | 5/1983 | Lerner | 222/56 |
| 4,398,612 | 8/1983 | Mikami et al. | 177/25 |
| 4,453,575 | 6/1984 | Del Rosso | 141/83 |
| 4,569,446 | 2/1986 | Kelley | 209/660 |
| 4,669,634 | * 6/1987 | Leroux | 222/77 |
| 4,843,579 | * 6/1989 | Andrews et al. | 364/567 |
| 4,979,608 | 12/1990 | Mikata et al. | 198/566 |
| 5,942,732 | * 8/1999 | Holmes | 141/83 |

\* cited by examiner

Primary Examiner—Henry J. Recla
Assistant Examiner—Khoa Huynh
(74) Attorney, Agent, or Firm—Thomas W. Hanson (57) ABSTRACT

A dispensing system using dual linear vibratory feeders, aligned along their longitudinal axes with their dispensing ends at substantially the same vertical location. The feeder trough of one feeder penetrates the structure of the other feeder, allowing them to be aligned and compactly located. Isolation mounts may be used to damp the vibration of the feeders. An optional metering pan serves as an intermediate stage which accepts supplied material and transfers it to the feeder without compaction or bridging. Resilient mounts and an adjustable mass on the pan allow the amount of vibrational energy transmitted to the pan to be adjusted independently of the energy supplied to the feeder by the vibratory motor. A counterweight may be used to shift the center of mass of the fixed portion of the feeder into alignment with that of the vibrating portion.

10 Claims, 8 Drawing Sheets

PASS-THROUGH DISPENSER SYSTEM WITH ALIGNED FEEDER TROUGHS

FIELD OF THE INVENTION

The present invention relates to the loading of a predetermined quantity of a bulk material into a container. More particularly it relates to precision loading of such container by two or more feeders with different feed rates.

BACKGROUND OF THE INVENTION

The need to automatically fill containers with tightly regulated amounts of a bulk material or discrete items is well known. Applications include putting pills into bottles, seeds into bags, and pyrotechnic material into air bag components. In some cases, such as supplying the fasteners for knock down furniture, the primary motivation for accuracy is economic. Shortage are expensive to rectify, overages are wasteful. In other cases, such as pharmaceuticals and pyrotechnics, the motivation is safety. Whatever the motivation, the need for accurately and quickly, dispensing materials is increasing. As with all production operations, higher speed translates to reduced costs, but the accuracy can not be sacrificed.

Many different approaches to accurately and quickly dispensing bulk materials have been used. Among the most common are volumetric cups or shuttles; augers, vibratory bowl feeders and linear vibratory feeders. Of these, linear vibratory feeders are the most versatile. They can handle a broad range of materials including abrasives and materials which tend to compact While linear feeders can be designed to handle a wide range of materials and flow rates, a particular design is limited to a relatively small range of rate or accuracy. This is due to the inherent limitations of the design. A linear vibratory feeder operates by vibrating a linear feed trough to move the material from a supply (usually a cup or hopper) to the discharge end of the trough. At the end of the trough, the material falls off the end into a receiving container. The discharge rate is directly proportional to the width of the end of the trough and the bed depth of the material at the end. Wider troughs and deeper bed depths provide proportionally higher discharge rates. Unfortunately, the accuracy of a feeder is inversely proportional to exactly these same characteristics. An accurate feeder will have a very narrow end and shallow bed depth. A feeder's accuracy is roughly proportional to the quantity of material which will be discharged the end on one cycle of the motor. Where discrete items are being dispensed, such as pills or pellets, the highest accuracy is obtained where only a single pill or pellet is available at the end of the trough. These competing demands have led to the use of two separate troughs: one for bulk feed; and one for trickle, or top-off, feed. One way of doing this involves separating a single trough into two separate paths, one with a small capacity and small discharge end. The two paths are physically attached and driven by a single vibratory motor. A gate blocks the flow from the larger, bulk, path when the target amount is approached and the trickle path finishes off the fill. A problem with this approach is that the material in the bulk path continues to feed while the trickle path is in use, and the material builds up behind the gate. This may result in compaction of the material, block the feeder, or may result in a surge of material being dispensed once the gate is reopened. In a worst case, the surge may be greater that the entire amount desired to be dispensed, resulting in an overfill.

Some systems utilize two or more feeders which supply a different rate or quantity of material. The receiving container is then moved between stations to achieve a complete fill. This increases the complexity of the system and can increase the cycle time required for a fill.

Some multiple feeder systems become quite large due to the size of the individual feeders. This is especially true where multiple bowl feeders are used. Because of their size, if multiple feeders are ganged together to provide a system with multiple fill stations, the resulting system is quite large.

Bowl feeders and some of the linear feeder designs use a sweep or other method to reduce the bed depth on the trickle path by pushing excess material over the edge of the feeder, typically at a single point In some designs it falls into the attached bulk path and in others it falls into an overflow catch and needs to be recycled into the supply hopper. Such recycling designs increase the cost of the system through an additional material path or manual transfer of the overflow material to the supply hopper. Further, recycling of material can lead to degradation (especially breaking up of pellets) or segregation of particulate sizes.

Other problems with bulk material feeders include bridging and compaction. Either can result in a blockage of the feeder or of an uneven flow of the material as the problem occurs and then breaks up. This is especially troublesome where a gate is positioned near the bottom of the supply hopper or reservoir.

There is a need for a feeder system which provides two or more feeders which discharge to the same location so that the receiving container need not be moved. The feeders should be independently controllable and independently driven so that the action of one does not affect the other. The feeders should handle a variety of bulk materials with minimal or no risk of compaction or bridging. To this end, no control gates should be used in the feeders. The design of the feeders should be compact to allow for ganging of multiple sets of feeders or for a compact layout for a single pair system. Ideally the feeder system will provide a supply path which provide a steady flow of material to the feeders at a relatively constant rate, also without compaction or bridging. The delivery rate of the supply path should be adjustable independently of the feeder rate.

SUMMARY OF THE INVENTION

The present invention is directed to an apparatus for dispensing precisely controlled quantities of bulk material into a receiving container at a single location using two or more independent linear vibratory feeders.

According to the invention there is provided a pair of linear vibratory feeders each having a trough and a vibratory motor, or other oscillation means, where the two troughs are aligned. A measuring device, such as a scale, provides data to a controller which activates the feeders independently.

According to an aspect of the invention the discharge ends of the troughs are vertically aligned, one above the other.

According to another aspect of the invention one of the feeders may include a reservoir for holding a quantity of the material being dispensed, and the reservoir has an opening through it, aligned parallel to the trough, which allows the trough of the other feeder to pass through it.

Further in accordance with the invention the upper trough may taper toward the discharge end so that only a small amount of material can be carried by the trough. As the material moves toward the discharge end, the excess will fall off into the lower trough, and be discharged by it.

Still further in accordance with the invention, the controller may activate both feeders for the initial part of the filling cycle, deactivate a first feeder when a certain quantity of material has been discharged, and then deactivate the second when the desired total amount is reached.

Yet further in accordance with the invention, an isolation mount will be used on one or both of the vibratory motors. The mount may be aligned parallel to the action of the motor.

Yet still further in accordance with the invention, a counterweight may be used to shift the center of mass of the fixed portion of the motor and feeder to a point where it is offset from the center line of the action of the motor an amount equal to the offset of the center of mass of the moving portion of the feed from the same line. This helps reduce any angular movement of the feeder.

Still further in accordance with the invention, a metering pan may be used as an intermediate stage between a supply hopper and the feeder to reduce compaction and bridging and provide a more even flow to the feeder. The metering pan may be resiliently mounted to the feeder and have a modifiable mass so that the amount of vibrational energy transmitted to the pan may be adjusted independently of the motor.

The advantages of such an apparatus are a compact arrangement of two independent feeders which are independently controllable and which dispense material at different rates. Used in concert, they can achieve both rapid and precise dispensing of bulk material. The alignment of the feeders, and the optional use of the isolation mounts and counterweight, simplifies the vibration modes which must be damped out and minimizes the effects of one feeder on the other. The pass through design allows a very compact layout of the feeders without compromising the other design features and facilitates the use of a tapered upper trough for singulation. The combination of the feeder layout, the metering pans, and the use of counterweights and adjustable masses on the metering pans results in a feeder system which can accurately feed materials which typically compact or bridge.

The above and other features and advantages of the present invention will become more dear from the detailed description of a specific illustrative embodiment thereof, presented below in conjunction with the accompanying drawings.

DETAILED DESCRIPTION OF THE INVENTION

The following discussion focuses on the preferred embodiment of the invention, in which a single pair of dispensers is used to dispense dry, bulk material. However, as will be recognized by those skilled in the art the disclosed apparatus is applicable to a wide variety of situations in which dispensing of bulk materials at more than one rate is desired.

Terminology

The following is a brief glossary of terms used herein. The supplied definitions are applicable throughout this specification and the claims unless the term is clearly used in another manner.

Bulk feeder—feeds the relatively larger quantity of material.

Bulk material—dry products including powders, granules, pellets, tablets, or small parts.

Feeder—mechanism for feeding items or material to a particular location or in a particular direction.

Dispenser—system for dispensing items or material comprising at least one feeder and associated mechanisms such as controllers, and gates.

Linear vibratory feeder—specific form of feeder which feeds items or material in a straight line by utilizing vibratory motion of the feeder.

Material—generally the items or bulk material being dispensed by the system. This term is intended to encompass anything capable of being dispensed by the general type of dispenser disclosed. Unless the distinction is important, discrete items and bulk material will be considered interchangeable and will be referred to as material herein.

Measuring device—any mechanism or technique capable of determining the quantity of material dispensed by each dispenser individually or both in combination. In the preferred embodiment this is a scale which weighs the receiving container and the total amount of material dispensed. This could also be a counter, a flow meter, or other device.

Metering pan—in the present invention, a platform near the top of the reservoir which intercepts and redirects the flow of material from the hopper.

Receiving container—container into which the dispensed items or material are discharged. May be the final item being filled or may be an intermediate container such as a dump bucket.

Reservoir—holds a relatively small quantity of material received from the hopper and supplies the material to the trough. When used with a metering pan, the reservoir may hold little or no material, acting primarily as a guide.

Singulation—generally a process of reducing a flow of material from a two or three dimensional flow of items to a one-dimensional linear flow of individual items.

Supply hopper—holds a relatively large quantity of material and supplies it to one or more dispensers. A single hopper may supply more than one set of dispensers as described herein, especially where such dispenser sets are ganged.

Trough—elongated, generally concave structure through which items or material move.

Trickle feeder (a.k.a. top-off feeder)—feeds the relatively smaller quantity of material.

Preferred Embodiment

The disclosed invention is described below with reference to the accompanying figures in which like reference numbers designate like parts.

Overview

Figure 1:
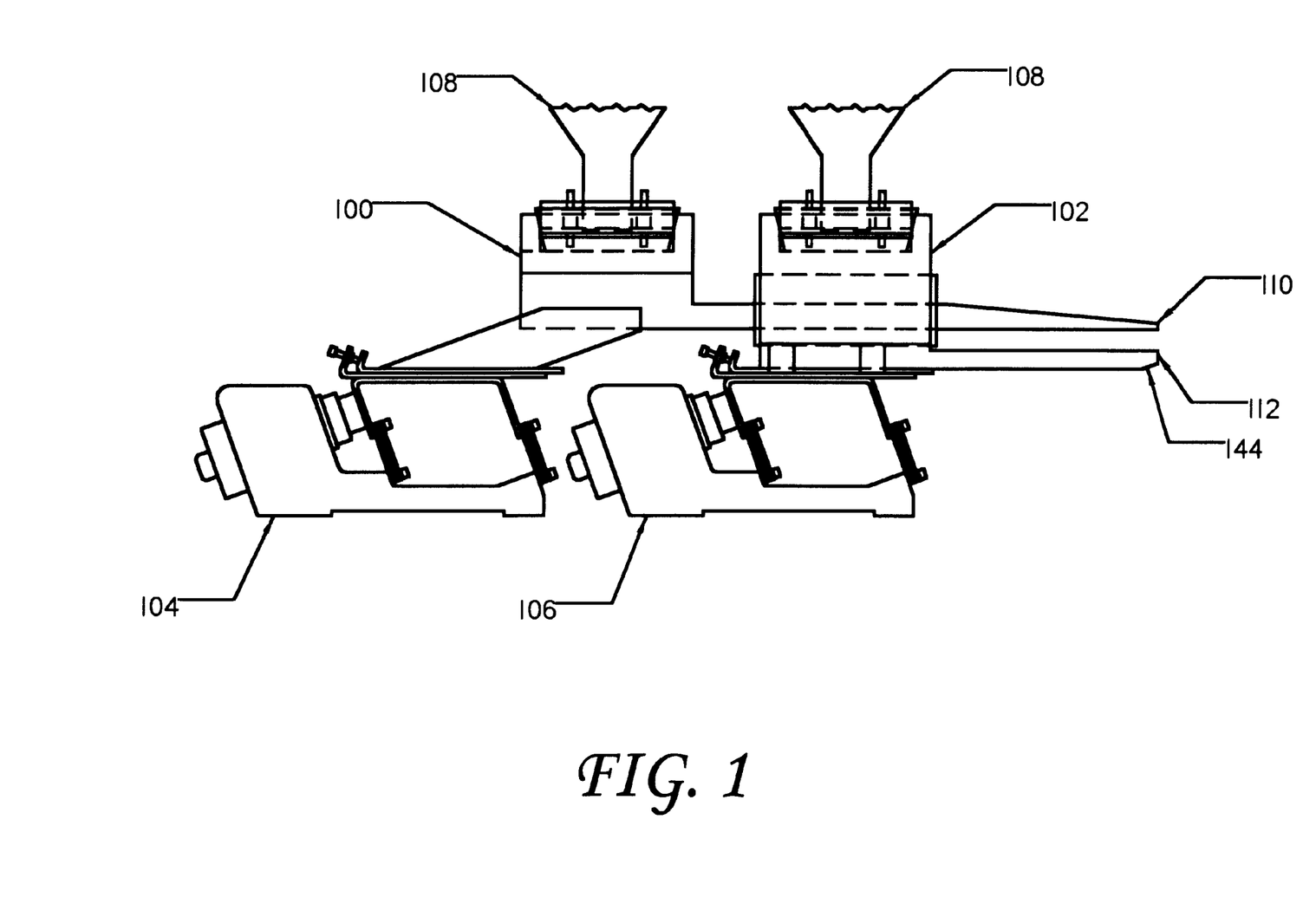
FIG. 1 provides a side view of the dual feeder arrangement with the vibratory motors.

Referring to FIG. 1 the preferred form of the dispensing system can be seen. Two separate feeders, 100 and 102, are aligned longitudinally with their discharge ends, 110 and 112, in substantial vertical alignment The feeders are supplied material by a supply hopper, 108, which may be either a single hopper with two discharge chutes or two separate hoppers. The feeders are energized by separate motors, 104 and 106. This architecture allows either feeder separately, or both feeders simultaneously, to discharge material into a single receiving container (not shown) without moving the container. This separate activation eliminates the need for control gates, and the accompanying surge of material when the gate is opened, as are used on some dual trough designs. Performance of the system has been optimized by providing for the penetration, or pass-through, of one of the feeders, 100, through the other, 102. As will be discussed below, this provides improved structural and dynamic features.

Figure 2:
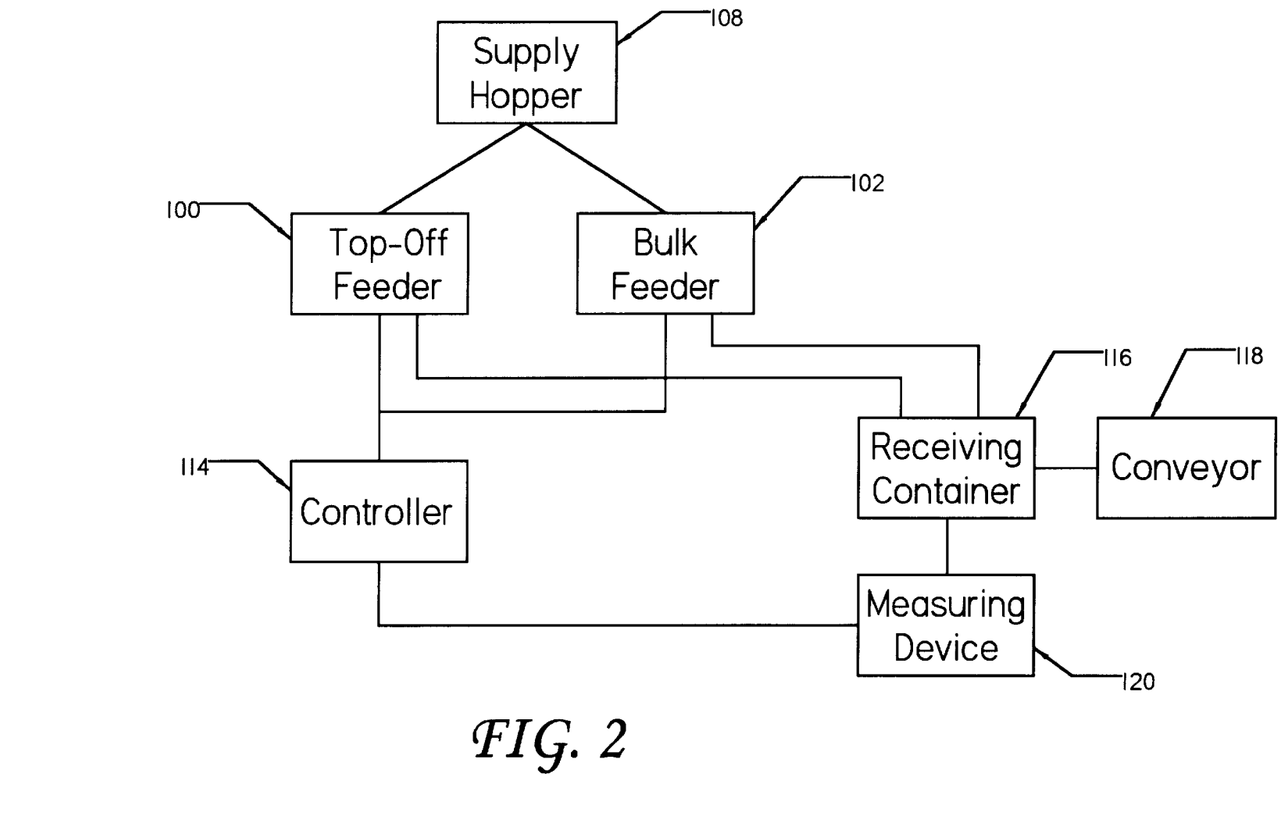
FIG. 2 is a block diagram of the dual feeder arrangement.

The block diagram of FIG. 2 illustrates the operation of the system. The supply hopper, 108, provides material to the top off feeder, 100, and the bulk feeder, 102. The feeders, in turn, supply material to the receiving container, 116, in regulated quantities. In the preferred embodiment, the quantity dispensed is determined by the measuring device, 120, as it flows into the receiving container. Preferably, this is a scale which weighs the material in the receiving container. Alternatively, this could also be a counter for discrete items, a flow meter, or any other device capable of determining the quantity of material dispensed. An optional conveyer, 118, moves containers into position for filling and removes them when full. This could be a belt, table, or any other suitable mechanism. Where a dump bucket, or other intermediate device is used, the conveyor may not be needed or may be more remotely located. The controller, 114, utilizes input data from the measuring device and activates the feeders in a manner determined to best fill the receiving container with the desired quantity of material.

Generally, the controller, 114, attempts to dispense some predetermined target quantity of material into a receiving container during a periodic fill cycle. The target quantity is typically specified as a target value with an over and under tolerance. The over and under tolerances may be the same (i.e. 1000 g. +/−10 g.) or they may be different (i.e. 500 g.+10 g./−5 g.). Either value may be zero, but generally not both. The goal is to fill the container as rapidly as possible (thus shortening the fill cycle time and increasing production) while maintaining the required tolerances. To this end, two feeders are provided which are adapted to these two goals. The bulk feeder, 102, is designed to rapidly fill the receiving container to a point close to, but not exceeding the target quantity. The trickle feeder, 100, then completes the filling by providing a lower volume, more tightly controlled amount of material until the total amount dispensed falls within the tolerance range. Because the two feeders are independently controlled, the controller has some flexibility in how to utilize them. In the preferred embodiment, both feeders are activated at the start of the fill cycle. As a first threshold value is reached, somewhat below the target quantity, the bulk feeder is deactivated. The trickle feeder continues to dispense until a target value is reached and then it is deactivated. The target value may be the lower tolerance value or it may be different. In some cases, the target may actually be less than the lower tolerance. This allows for material which is in the air (i.e. has left the end of the trough but not yet reached the receiving container) to complete filling the container to tolerance. This target value may be adjusted by the system or by the operator as necessary to optimize the final fill weight. The deactivation of the trickle feeder ends the fill cycle and the conveyor, dump bucket, or other mechanism is signaled to remove or empty the receiving container. When that device has performed its task and another container (or the same container, emptied) is ready, the fill cycle starts again. Alternative control methods are readily accommodated. As an example, the feeders may be operated in a strict sequential manner, never both being activated at the same time, in order to minimize the amount of vibration produced by the system. The controller may be a simple hardware implementation which supports only a single fill method and target quantity, or it may be a very flexible, microprocessor based system including display screens, input devices, logging devices, and communications interfaces which can be adapted to a wide range of dispensing applications.

It should be noted that this architecture is easily extended to the use of three or more feeders where greater variation or finer gradation in feed rates is desired.

Features

Figures 3, 4:
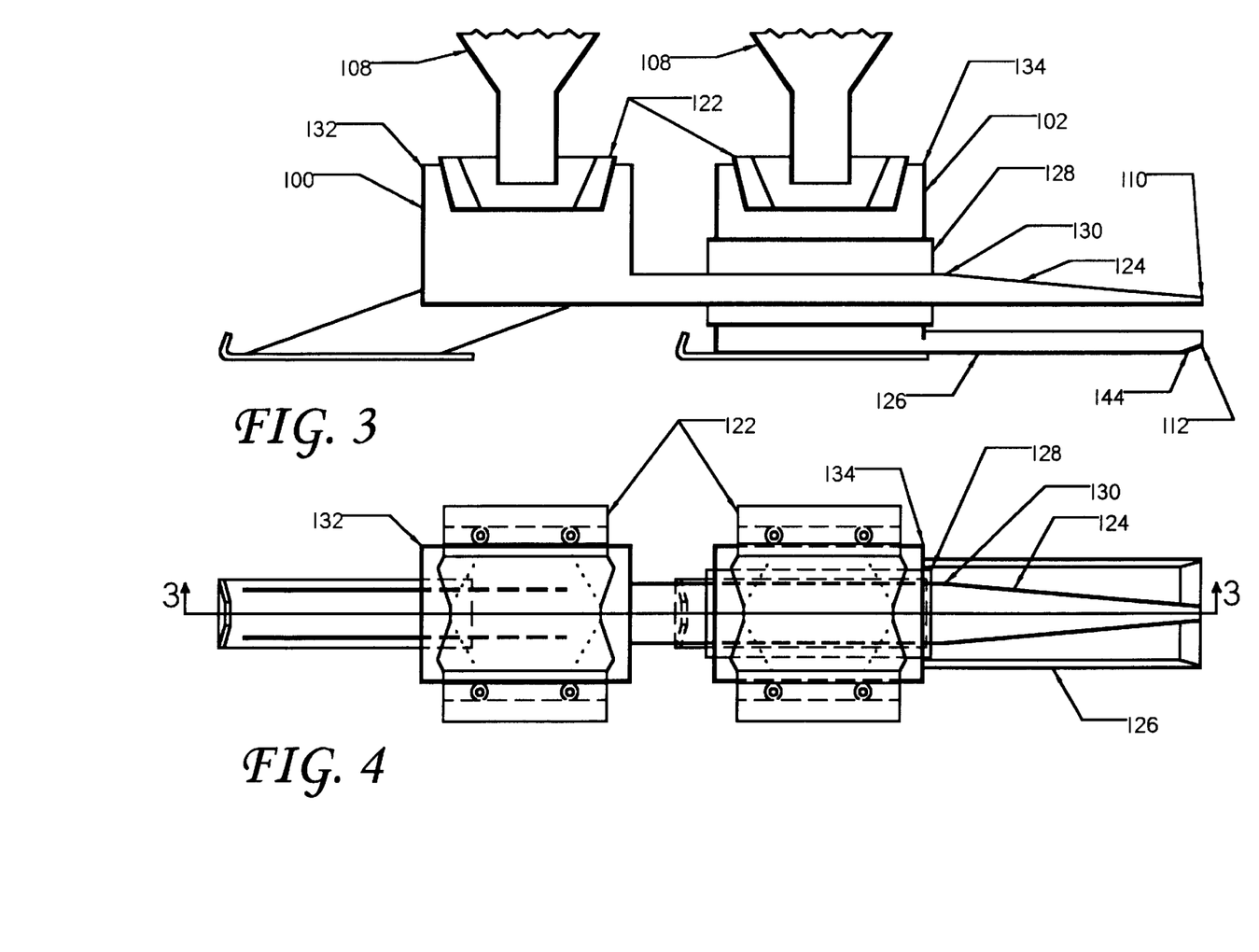
FIG. 3 is across section through the dual feeder arrangement without the motors.
FIG. 4 is a top view of the dual feeder arrangement without the motors or hopper.

Referring to FIG. 3, the details of the design can be seen. As discussed above, dual feeders, 100 and 102, are used which are independently controllable and physically isolated. As shown, there is no direct physical coupling between the two feeders. The trough, 124, of the trickle feeder, 100, passes through the tube, 128, in the reservoir of the bulk feeder, 102. Sufficient clearance is provided around the trough so that it does not make contact at any time in its operation. In the preferred embodiment this tube is of round cross section, which has been found to provide both good clearance and good material flow around the tube within the bulk feeder reservoir, but other shapes are clearly applicable.

The primary motivation behind the use of the pass-through tube, 128, in the bulk feeder, 102, is that it allows the trickle feeder trough, 124, and the bulk feeder trough, 126, to be aligned in the same vertical plane and to feed to the same horizontal location with minimal vertical separation. This arrangement also provides a simple, straight path for the material flowing from the hopper to the feeders. Referring to FIG. 3, it can be seen that the trough are substantially parallel and that the trough ends, 110 and 112 are aligned vertically. Referring to FIG. 4, it can be seen that the troughs are aligned vertically with the trickle feeder trough directly above the bulk feeder trough. This arrangement results in the vibratory forces applied to the two feeders being in the parallel planes. This greatly simplifies the task of damping these vibrations by eliminating complex interactions. This same result could be achieved with opposing feeders which face each other while still being aligned in the same plane. However, this would result in a very large footprint for the combined feeders and would eliminate the approach to singulation discussed below. The design of the present invention provides for a very compact arrangement of the two feeders. This reduces the size of the overall system, shortens wiring paths, and reduces the size, cost, and weight of the support structure. The compact layout also enables ganging of multiple pairs of feeders in a relatively compact system.

The alignment of the trickle and bulk trough enables a second feature of the present design. As can be seen in both FIGS. 3 and 4, the trickle feeder trough, 124, tapers in both its horizontal and vertical profiles from a point, 130, just past the tube, 128, to its discharge end, 110. This taper provides a simple, efficient method of singulation. The discharge end of the trough is sized for a particular application so that it will hold only a single item (pellet, tablet, screw, nut, etc.). For loose material, the end would be sized for a unit of material less than the required fill tolerance. As the bed of material flows from point 130 toward the discharge end, excess material overflows the edges of the trough. As the end is approached, the walls of the trough become increasingly lower and additional material overflows. Near the end, only a single item can be contained, resulting in a linear flow of single items. Note that the bulk trough, 126, is noticeably wider than the trickle trough. As such, the material which overflows the sides of the trickle trough falls into the bulk trough and will be discharged as part of the bulk flow. This eliminates the need for a recycle path as is necessary for the overflow material in some designs. The gradual taper of the trickle trough results in a relatively uniform distribution of overflow material into the bulk trough. This avoids dumps of material in the bulk trough. Such dumps would result, for example, where a fixed wiper is used with the trickle feeder to achieve singulation and the bulk feeder is idle while the trickle feeder is operating. All overflow would accumulate at the same location in the bulk trough, possible resulting in an overfill when that accumulation reaches the discharge end of the bulk trough.

Figure 5:
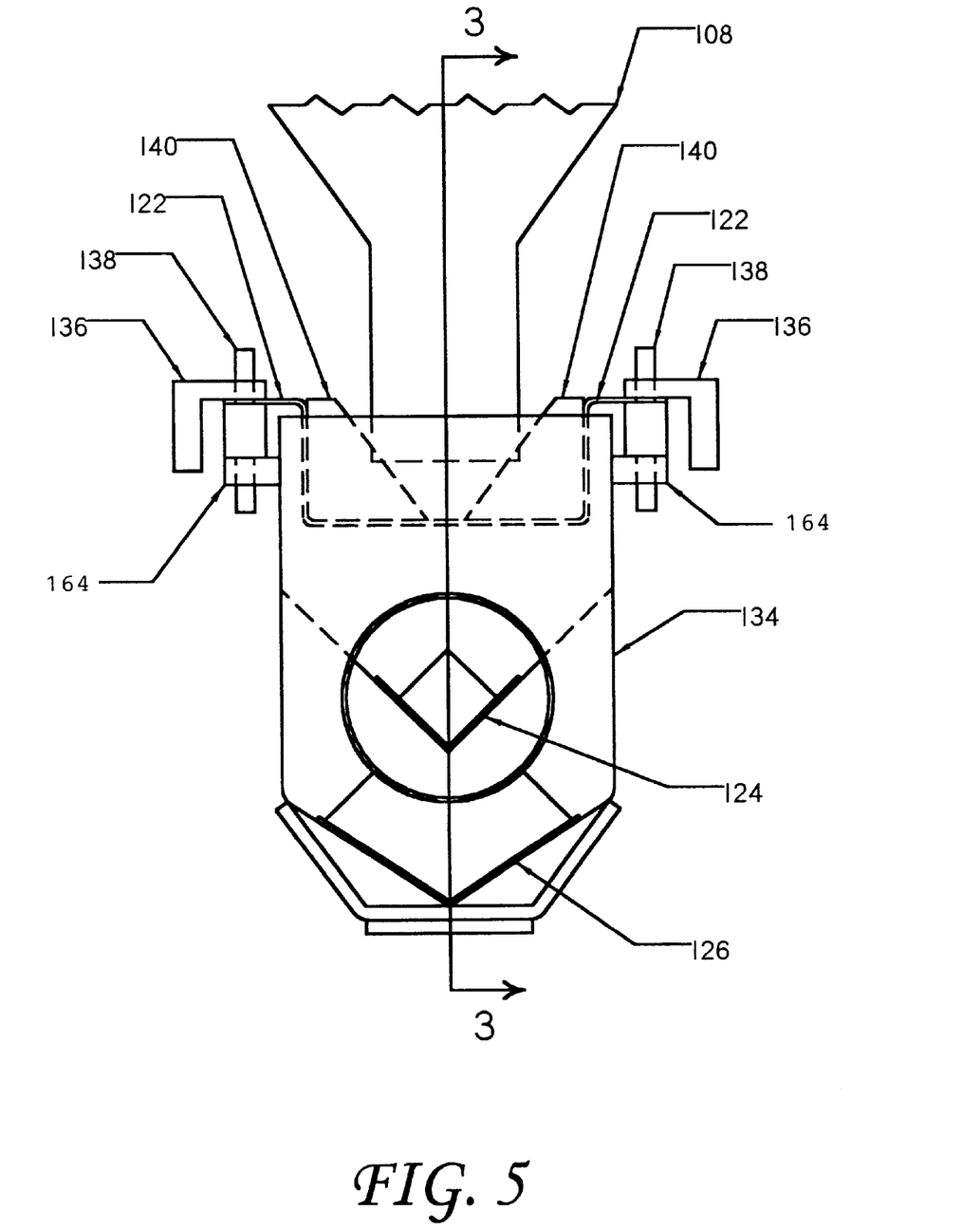
FIG. 5 is an end view of the dual feeder arrangement.

In both feeders, the metering pans, 122, serve as an intermediate stage for the flow of material from the hopper, 108, to the reservoirs, 132 and 134. Certain materials, including pellets, will tend to flow unevenly from a hopper. If fed directly to the feeder reservoir, the result would be an uneven bed depth in the trough. The metering pans accept this uneven flow from the hopper and feed it more evenly to the feeder reservoirs. Referring to FIG. 5, the attachment of the metering pan to the feeder reservoir can be seen. Brackets, 164, extend from the reservoir and mount resilient isolation mounts, 138, which in turn mount the metering pan. Weights, 136, also mount to the metering pan. In this manner vibration is transmitted to the metering pan from the feeder reservoir when the feeder is activated. The use of the isolation mounts and weight results in less vibrational energy being transmitted to the metering pan than is applied to the reservoir. This results in the feeder emptying the reservoir at a higher rate that the metering pan is filling it, resulting in a uniform, shallow bed depth of material in the trough and minimal risk of compaction in the reservoir. The stiffness of the mounts and the mass of the weights can be varied to adjust the vibrational energy transfer to the metering pan for different applications.

Figure 11:
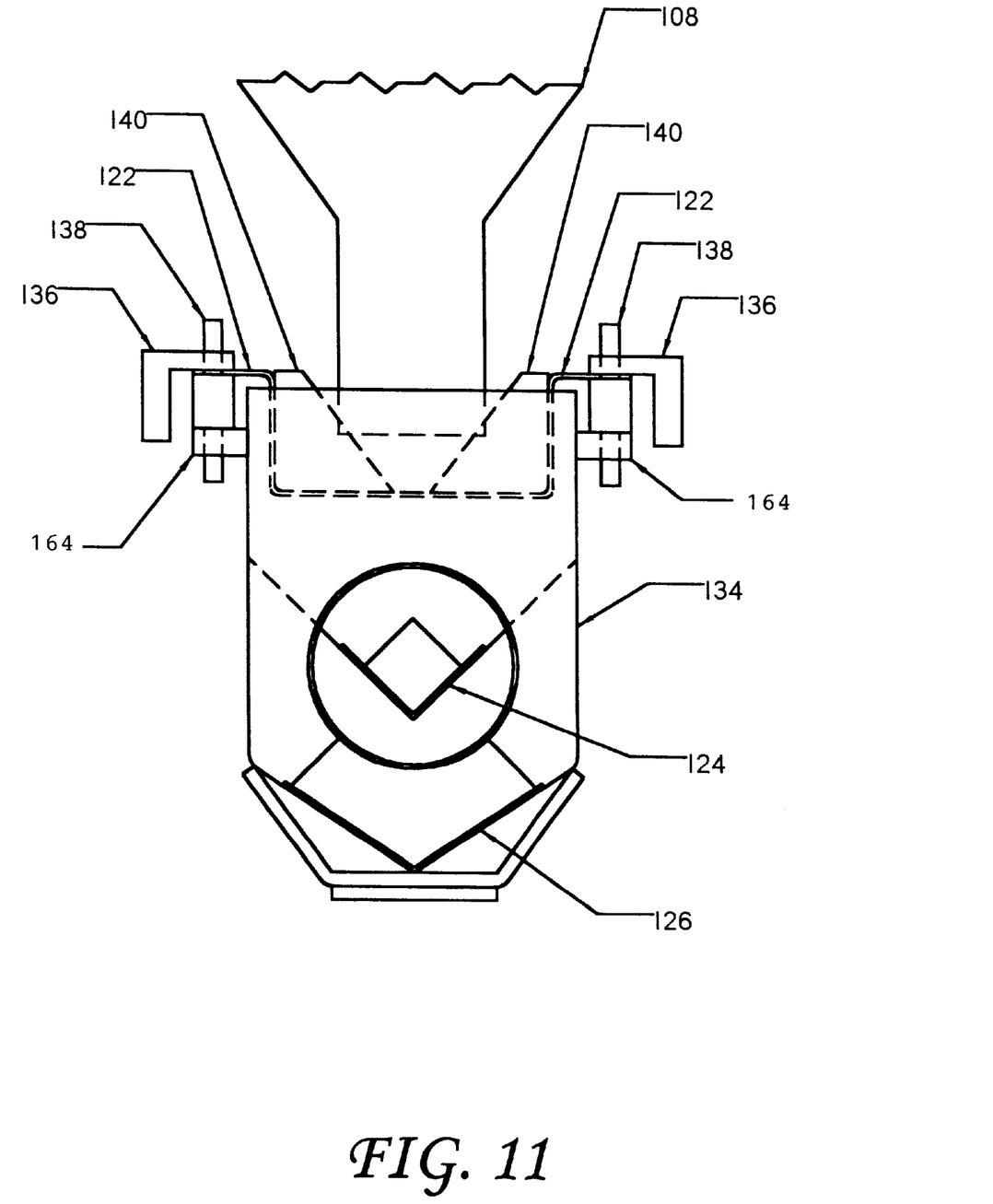
FIG. 11 provides an end view of an alternative embodiment of the bulk feeder.

As shown in FIGS. 1, 3 & 4, in the preferred embodiment, the trough for the bulk feeder, 126, is built with a flat bottom providing a relatively wide, shallow cross-section. In combination with the metering pans this design results in shallow, uniform bed depth in the trough with relatively fast material movement The isolation of the metering pans allows the feeders to be driven harder to achieve the faster material movement. The overall result is high material throughput when the feeder is active, with minimal error due to material failing off after the feeder is stopped. The lip, 144, on the end of the trough further inhibits material fall off. An alternative form of the bulk feeder is shown in FIG. 11. The V-shaped trough provides a less uniform bed depth, but may be preferable for some materials.

Figure 6:
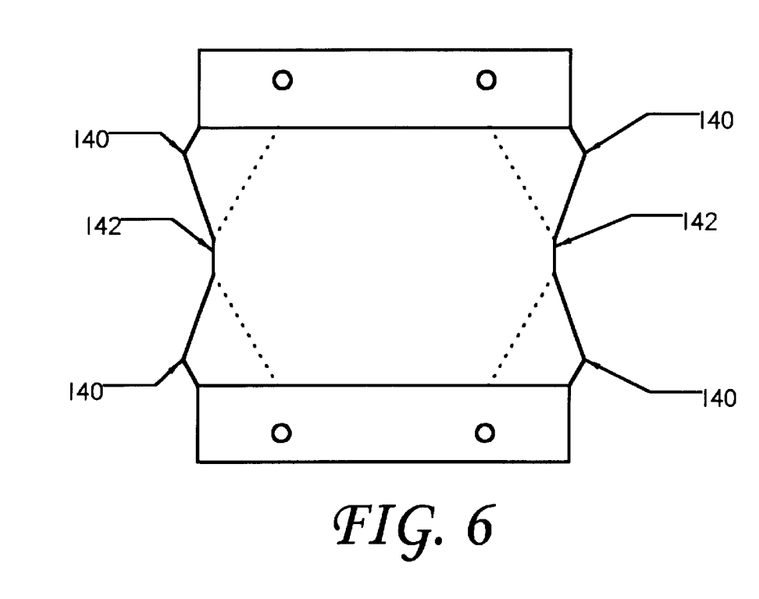
FIG. 6 is a top view of the feeder metering pan.
Figure 7:
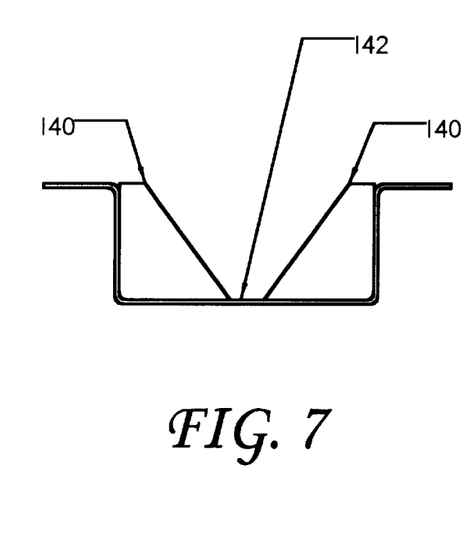
FIG. 7 is an end view of the feeder metering pan.
Figure 8:
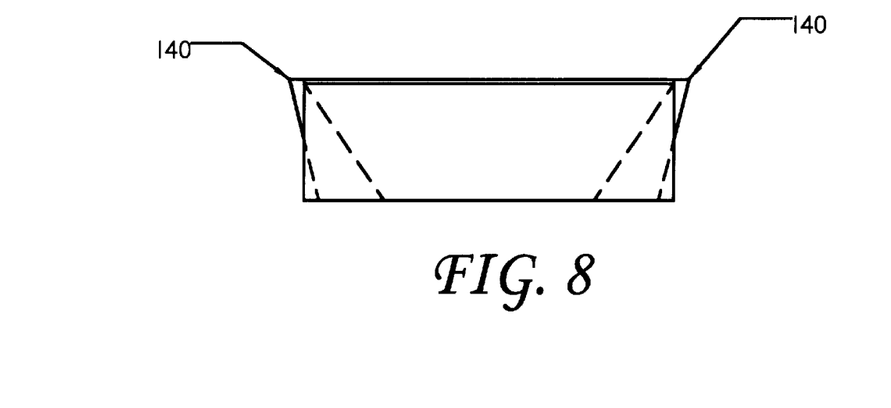
FIG. 8 is a side view of the feeder metering pan.

FIGS. 6–8 illustrate the details of the metering pan construction. The pan is symmetric, with a weir at either end. The sides of the opening, 140, taper toward the sides of the reservoir and slope outward from the ends. The resulting opening, 142, increases in width with height and angles outward. Normally, the material flows through the lower portion of the opening. If the material were to bridge the opening at the bottom and begin to build up, it would quickly reach an opening of sufficient size that it would begin flowing again, breaking the bridge. The size, angle, and taper of the opening can be adjusted during manufacture of the reservoir to adapt to different materials.

Referring again to FIGS. 3 and 5, it can be seen that the lower end of the hopper, 108, is positioned slightly above the floor of the metering pan, 122. This distance can be adjusted to tailor the material flow to the application. Typically it will be set so that there is no flow when the pan is not vibrating and provides a steady supply of material when it is. The mass of the weights, 136, is then adjusted to provide the desired flow rate of material through the weirs to the feeder reservoir. If necessary, the isolation mounts, 138, can also be replaced by mounts with different stiffness. This ability to adjust the vibrational energy transmitted to the metering pan and the configuration of the weir provides significant adjustability in the delivery rate of material from the hopper.

Figure 9:
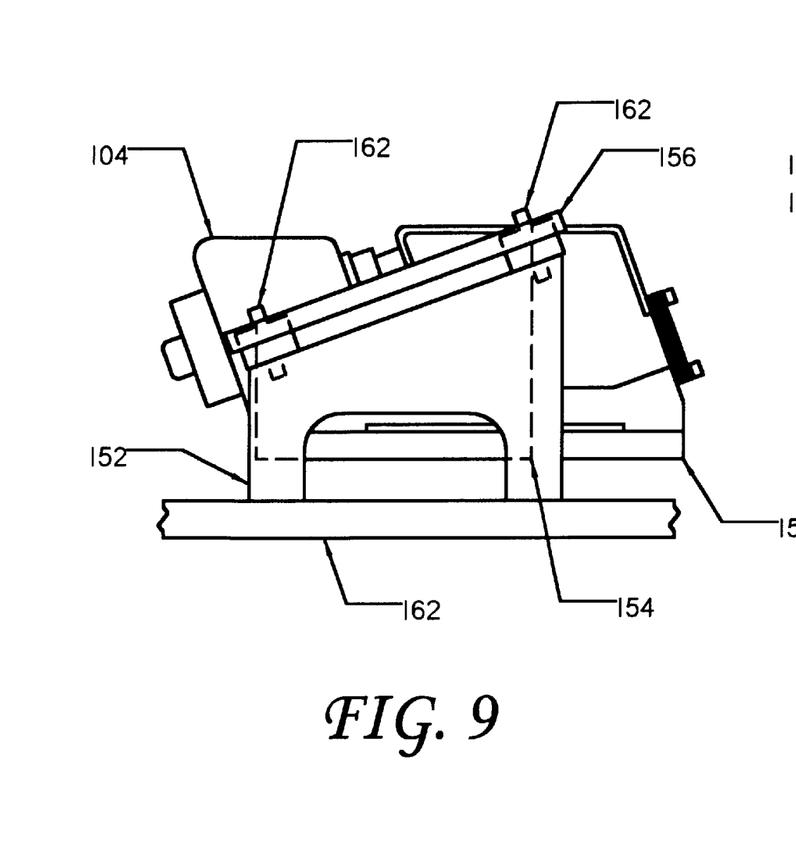
FIG. 9 is a side view of an optional isolation mount
Figure 10:
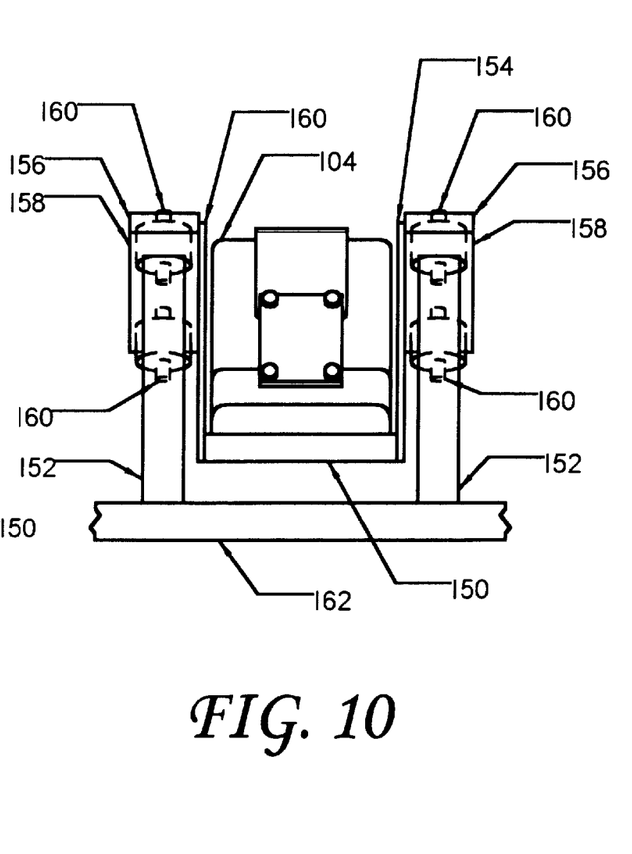
FIG. 10 is an end view of an optional isolation mount.

In the preferred embodiment, the vibratory motors are mounted on isolation mounts to further damp vibrations to prevent transference to the support structure and, through the structure, to the other feeder or to other vibration sensitive devices such as the measuring device. FIGS. 9 and 10 illustrate the mount used in the preferred embodiment. Base plate, 150, is affixed to the bottom of the motor, 104. Vertical plates, 154, connect the base plate to the upper connecting plate, 156. Connecting plates, 156, are joined to legs 152 by resilient mounts, 160. The connecting plate is aligned with the centerline of motion of the feeder. Legs, 152, then connect to the underlying structure, 162. These isolation mounts improve the accuracy of the system by reducing the vibration transferred to and from the feeders. Excess external vibration in a feeder may result in material dropping off the discharge end of the chute when the feeder is idle, resulting in an overfill.

Figure 12:
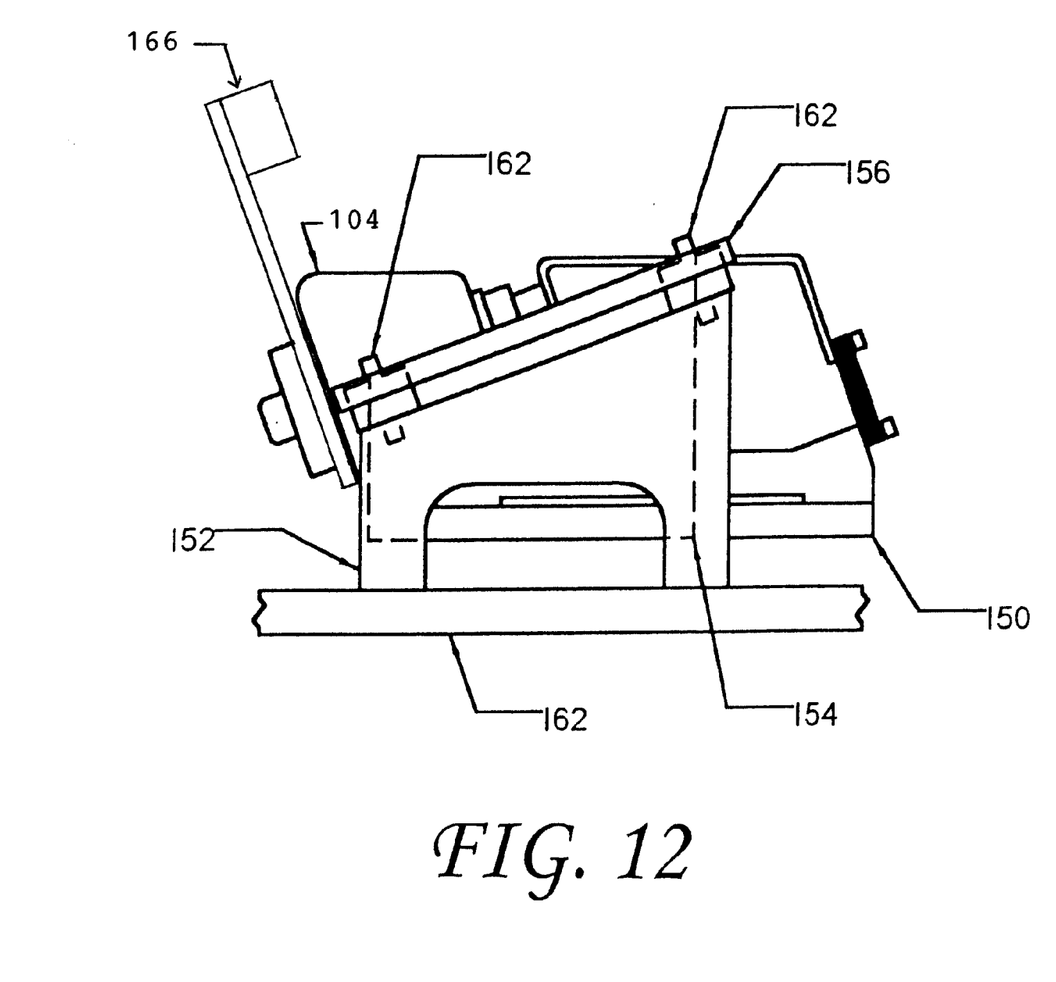
FIG. 12 is a side view of an alternative embodiment incorporating a counterweight.

The motion of the trickle feeder may be further optimized by the addition of a counterweight, 166, as shown in FIG. 12. This weight is attached to the fixed portion of the vibratory motor 104, and positioned above the centerline of the motor's action. This results in the center of mass of the motor being shifted to a point in line with the center of mass of the feeder and mounts. With the center of mass of the fixed portion of the motor at the same offset from the centerline of the motor as is the center of mass of the moving parts of the feeder, the angular, or whipping, motion of the feeder is reduced significantly. This is important where the feeder and trough are elongated as in the present design. Very slight angular motions result in noticeable movement of the discharge end of the tip. With the counterweight, the entire length of the trough exhibits the same linear displacement resulting in uniform movement of material along the length of the trough.

Alternative Embodiments

The preferred embodiment utilizes dual feeders to provide two different feed rates for the same material. By using multiple separate supply hoppers, the disclosed system is easily adapted to feed two different materials to the same point at different rates or quantities. These may be distinct materials but would be more likely different grades of the same material. As an example, the trickle feeder could be supplied with a fine grade of material while the bulk feeder uses a course grade. This would allow the trickle feeder greater control over the quantity dispensed.

While the preferred form of the invention has been disclosed above, alternative methods of practicing the invention are readily apparent to the skilled practitioner. The above description of the preferred embodiment is intended to be illustrative only and not to limit the scope of the invention.

What is claimed is:

1. Where it is desired to transfer dry bulk material from a supply hopper to a receiving container in precisely controlled quantities, a dispenser system comprising:

(a) at least one measuring device which determines a quantity of material dispensed and generates measurement signals corresponding to said quantity;

(b) a first and a second linear vibratory feeder, each comprising:
  (i) an elongated trough having a longitudinal axis and a discharge end, and
  (ii) means for generating linear oscillation of said trough responsive to control signals for activation and deactivation;
(c) a controller, in communication with said measuring device, responsive to said measurement signals by generating said control signals to said oscillation means; and
wherein said longitudinal axis of said first and second feeders are substantially aligned in the same vertical plane, said discharge ends of said first and second dispensers are substantially vertically aligned and each of said oscillation means is separately controllable.

2. Where it is desired to transfer dry bulk material from a supply hopper to a receiving container in precisely controlled quantities, a dispenser system comprising:
  (a) at least one measuring device which determines a quantity of material dispensed and generates measurement signals corresponding to said quantity;
  (b) a first and a second linear vibratory feeder, each comprising:
    (i) an elongated trough having a longitudinal axis and a discharge end, and
    (ii) means for generating linear oscillation of said trough responsive to control signals for activation and deactivation;
  (c) a controller, in communication with said measuring device, responsive to said measurement signals by generating said control signals to said oscillation means; and
wherein said longitudinal axis of said first and second feeders are substantially aligned in the same vertical plane, each of said oscillation means is separately controllable, wherein said first linear vibratory feeder further comprises a reservoir adapted to contain a quantity of the material and to supply the material to said first feeder trough, and a tube, passing through said reservoir parallel to said trough, defining an opening through said reservoir and wherein said second feeder trough extends through said opening.

3. Where it is desired to transfer dry bulk material from a supply hopper to a receiving container in precisely controlled quantities, a dispenser system comprising:
  (a) a first linear vibratory feeder comprising
    (i) a moveable portion comprising
      (A) an elongated trough having a longitudinal axis and a discharge end,
      (B) a reservoir adapted to contain a quantity of the material and to supply the material to said trough, and
      (C) a tube, passing through said reservoir parallel to said trough, defining an opening through said reservoir, and
    (ii) means for generating linear oscillation of said moveable portion responsive to control signals for activation and deactivation;
  (b) a second linear vibratory feeder comprising
    (i) a moveable portion comprising
      (A) an elongated trough extending through said opening in said first feeder's reservoir, longitudinally aligned with and substantially centered above said first feeder's trough, having sides which taper from a first height to lesser second height near said discharge end whereby the capacity of said trough reduces near said discharge end and material in excess of this capacity spills over said sides into said first trough;
      (iii) means for generating linear oscillation of said moveable portion responsive to control signals for activation and deactivation;
  (c) at least one measuring device which determines the quantity of material dispensed by said feeders and generates measurement signals corresponding to said quantity; and
  (d) a controller, in communication with said measuring device, responsive to said measurement signals by generating said control signals to said oscillation means.

4. The dispenser system of claim 3 wherein said controller generates separate control signals for each of said oscillation means.

5. The dispenser system of claim 4 wherein said controller is responsive to said measurement signals by initially activating both oscillation means, deactivating said first feeder oscillation means when said measurement signals indicate that a first threshold quantity has been discharged, and deactivating said second feeder oscillation means when a second threshold is reached.

6. The dispenser system of claim 3 wherein each of said feeders further comprises a resilient isolation mount connecting said feeder to a supporting structure.

7. The dispenser system of claim 6 wherein the motion generated by said oscillation means is substantially linear and wherein said isolation mount is substantially parallel to said linear motion.

8. The dispenser system of claim 3 wherein in at least one of said feeders, said means for oscillation comprises a fixed portion and an oscillating portion with a centerline of motion; said moveable portion has a center of mass offset from said centerline of motion; and said means for oscillation further comprises a counterweight attached to said fixed portion which alters the center of mass of said fixed portion to be offset from said centerline of motion a distance substantially equal to said moveable portion center of mass offset in both magnitude and direction.

9. The dispenser system of claim 3 wherein at least one of said feeders further comprises a metering pan attached to said moveable portion which receives the material from the supply hopper said metering pan comprising a weir forming an opening which increases in width with increased height.

10. The dispenser system of claim 9 wherein said metering pan is mounted to said movable portion by resilient means whereby said metering pan oscillates with a different magnitude of vibration than said moveable portion.

* * * * *